(12) United States Patent
Nentwig

(10) Patent No.: US 8,576,897 B2
(45) Date of Patent: *Nov. 5, 2013

(54) RECEIVER

(71) Applicant: Renesas Mobile Corporation, Tokyo (JP)

(72) Inventor: Markus Nentwig, Helsinki (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,116

(22) Filed: Sep. 24, 2012

(65) Prior Publication Data

US 2013/0070818 A1 Mar. 21, 2013

Related U.S. Application Data

(63) Continuation of application No. 13/234,393, filed on Sep. 16, 2011.

(30) Foreign Application Priority Data

Sep. 16, 2011 (GB) .................................. 1116090.0

(51) Int. Cl.
*H04B 1/38* (2006.01)
*H04L 27/18* (2006.01)

(52) U.S. Cl.
USPC .............................. 375/219; 375/279; 455/73

(58) Field of Classification Search
USPC ......... 375/219, 220, 222, 268, 271, 272, 278, 375/279, 284, 285, 316, 326, 327, 344–346, 375/355; 455/73, 78, 82–86

See application file for complete search history.

(56) References Cited

U.S. PATENT DOCUMENTS

| 4,604,699 | A | * | 8/1986 | Borcherdt et al. | ............... 702/15 |
| 5,612,975 | A | * | 3/1997 | Becker et al. | ................. 375/319 |
| 8,149,896 | B2 | * | 4/2012 | Filipovic | ....................... 375/147 |
| 2010/0316098 | A1 | | 12/2010 | Pals et al. | |

OTHER PUBLICATIONS

UK IPO Combined Search and Examination Report under Section 17 and 18(3) dated Jan. 16, 2012 issued in a related British Application No. GB1116090.0 (6 pages).

* cited by examiner

*Primary Examiner* — Young T. Tse
(74) *Attorney, Agent, or Firm* — Lucas & Mercanti LLP; Robert P. Michal (57) ABSTRACT

A method, apparatus and computer program product for a method of operating an analog-to-digital converter of a transceiver which includes a transmitter and a receiver, the receiver including the analog-to-digital converter. The method includes determining a maximum conversion rate of the analog-to-digital converter, wherein the determining step includes determining a temperature of the analog-to-digital converter, and selecting a conversion rate of the analog-to-digital converter, based on the determined maximum conversion rate and a frequency of an unwanted signal component of the receiver, such that the selected conversion rate places an alias response of the unwanted signal component to a frequency range which is substantially non-overlapping with a wanted signal component of the receiver.

18 Claims, 9 Drawing Sheets

Figure 1

PRIOR ART

| Temperature | Maximum conversion rates of the analog-to-digital converter |
|---|---|
| T1 | MCR1 |
| T2 | MCR2 |
| T3 | MCR3 |
| T4 | MCR4 |
| T5 | MCR5 |
| T6 | MCR6 |
| T7 | MCR7 |

FIG. 8

RECEIVER

CROSS-REFERENCE TO RELATED APPLICATIONS

This is a Continuation of U.S. patent application Ser. No. 13/234,393, flied Sep. 16, 2011, and claims the benefit under 35 U.S.C. §119 of British Patent Application No. 1116090.0 filed Sep. 16, 2011, the entire disclosure of each of which is incorporated herein by reference.

TECHNICAL FIELD

The present invention relates to wireless receivers that support cellular standards such as LTE, triple-carrier WCDMA. More particularly, but not exclusively, the invention relates to the operation of an analog-to-digital converter comprised in such a receiver.

BACKGROUND

Figure 1:
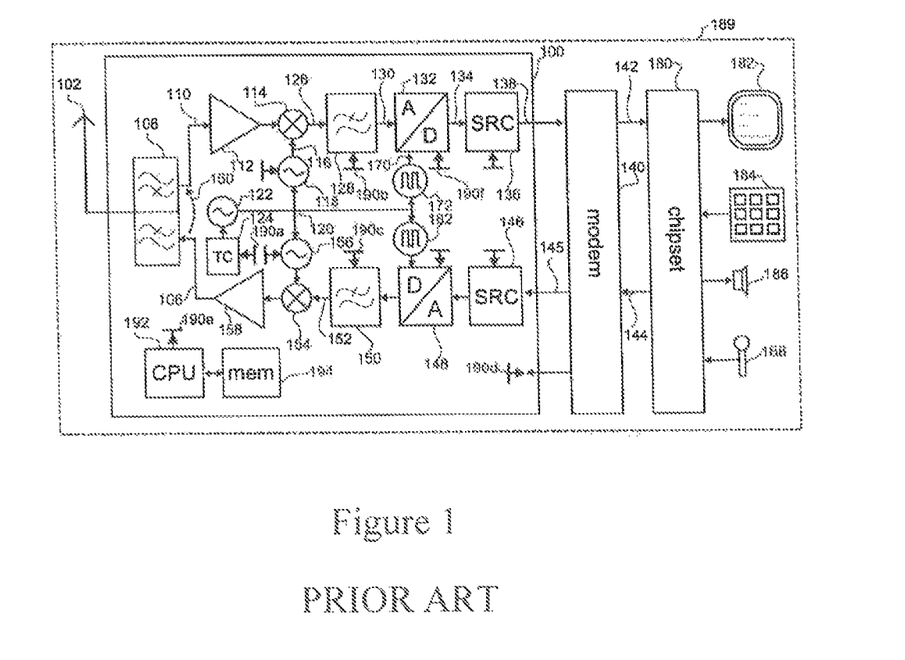
FIG. 1 is a block diagram that illustrates a general structure of a radio frequency transceiver, comprising a transmitter and a receiver, the receiver comprising an analog-to-digital converter.

Full duplex radio frequency (RF) transceivers are capable of transmitting and receiving radio signals simultaneously at different frequencies. FIG. 1 shows a transceiver 100 that transmits and receives radio frequency signals through one or more connected antennas 102 and connects via digital interfaces to a modulator/demodulator (modem) 140. Transceiver 100 and modem 140 may be integrated together with display 182, keypad 184, loudspeaker 186, microphone 188 and chipset 180 into a mobile wireless device 189 such as a mobile phone. Other applications of radio frequency transceivers include use in base stations or machine-to-machine communications such as vending machines or cash registers, for example.

Transceiver 100 comprises a transmitter and a receiver. The receiver processes a received radio frequency signal that is picked up by antenna 102 and converts it to a down-sampled received signal 138. The received radio frequency signal comprises a wanted signal component, for example encoded speech data in a voice call that is decoded and sent to loudspeaker 186. The transmitter converts a digital data stream 145 that may for example encode voice data from microphone 188 to a radio frequency signal that is transmitted by antenna 102.

In the receiver, a radio frequency input signal from antenna 102 is coupled to duplex filter 108, where only a predetermined receive band frequency range passes through to receive path signal 110. Receive path signal 110 is amplified by low-noise amplifier 112 and down-converted into baseband signal 126 by receive path mixer 114 using receiver local oscillator signal 116.

Receiver local oscillator signal 116 is generated at a received channel frequency by receiver synthesizer 118 based on a reference clock 120, and may comprise an in-phase component and a quadrature component.

Receive path mixer 114 may implement quadrature down-conversion using a pair of mixers, providing an in-phase and a quadrature component of baseband signal 126.

Baseband signal 126 is filtered by analog baseband filter 128, and the resulting filtered baseband signal 130 is sampled by analog-to-digital converter (ADC) 132 using an ADC sampling clock signal 170 that is provided by ADC sampling clock generator 172 at an ADC conversion rate, resulting in sampled received signal 134. Analog baseband filter 128 may comprise an in-phase branch and a quadrature branch. Also ADC 132 may comprise an in-phase branch and a quadrature branch.

A first sample-rate converter 136 converts sampled received signal 134 into down-sampled received signal 138 at a lower sampling rate. Down-sampled received signal 138 is provided to modem 140.

In the transmitter, digital transmit signal 145 is provided by modem 140 to transceiver 100, where it is converted to a higher sample rate in second sample-rate converter 146, converted to an analog signal in digital-to-analog converter (DAC) 148 using a DAC sampling clock signal that is provided by DAC sampling clock generator 162, low-pass filtered by transmit baseband filter 150 into transmit baseband signal 152, up-converted to radio frequency by transmit mixer 154 using a transmitter local oscillator signal, and amplified by transmit amplifier 158 resulting in transmit signal 106. Transmit signal 106 is coupled by the duplex filter 108 to antenna 102.

The transmitter local oscillator signal is generated at a transmitted channel frequency by transmit synthesizer 156 from reference clock 120 and may comprise an in-phase and a quadrature component.

Reference clock 120 may be generated by a reference crystal oscillator 122. Reference crystal oscillator 122 may be connected to a temperature compensation unit 124. Temperature compensation unit 124 may comprise a temperature sensor that can be queried through bus interface 190a, and offset circuitry for reference crystal oscillator 122 that can be controlled through bus interface 190a, for example by CPU 192. Temperature compensation unit 124 may also autonomously measure the temperature and apply offset correction to reference crystal oscillator 122.

The transmit signal 106 is generated at a sufficiently high power level for transmission, for example 24 dBm at the antenna 102. A part of transmit signal 106 leaks into the receive path signal 110 due to unwanted coupling mechanism 160, resulting in an unwanted signal component known as "transmit leakage". Unwanted coupling mechanism 160 may be caused by finite attenuation of duplex filter 108 or parasitic coupling between lines on a printed wiring board, for example. The transmit leakage is processed by the receive path, appearing at the input of analog-to-digital converter 132 at a frequency offset relative to the wanted signal component. Depending on the frequency offset and the ADC conversion rate, the transmit leakage may result in an alias component created by ADC 132.

Figure 2A:
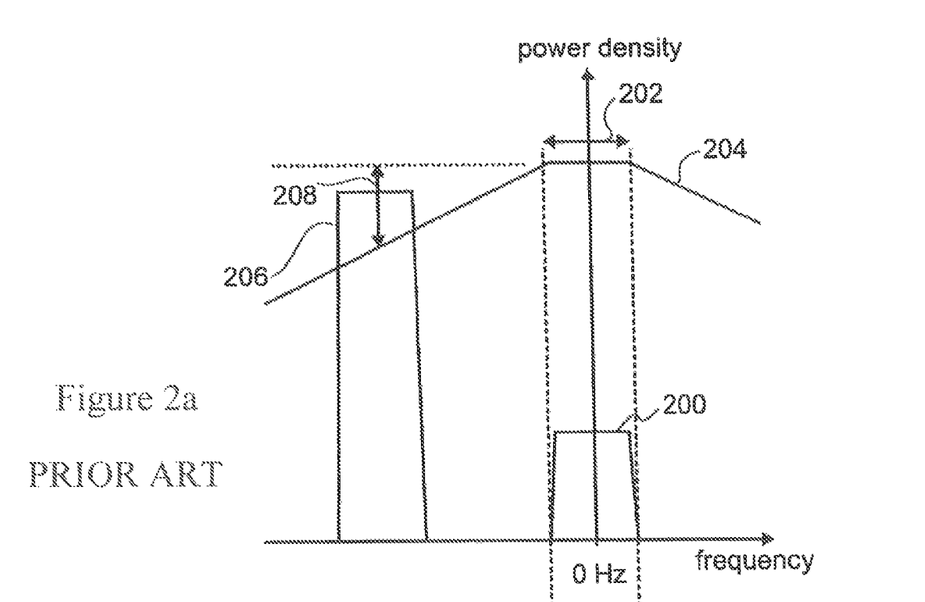
FIGS. 2a-2f are frequency domain graphs that illustrate aliasing processes in an analog-to-digital converter.

FIG. 2a shows a spectrum of signals at the input of analog baseband filter 128 in FIG. 1 on a frequency axis. A wanted signal component 200 falls into a pass-band 202 of a frequency response 204 of analog baseband filter 128 in FIG. 1. A transmit leakage component 206 is attenuated by a stop-band gain 208 of frequency response 204.

Figure 2B:
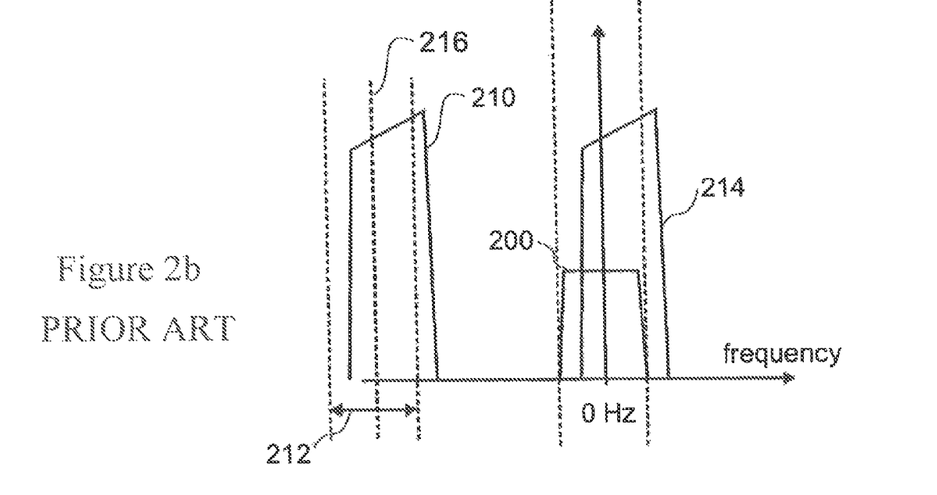

FIG. 2b shows the output of analog baseband filter 128 which appears as input signal to ADC 132. Even after attenuation by, analog baseband filter 128, the attenuated transmit leakage component 210 still carries considerably higher power than wanted signal component 200 and substantially overlaps alias response 212 around a conversion rate 216. Alias response 21 is caused b sampling within ADC 132, causing signal components near the Nyquist frequency to fold back and appear as replicas in the sampled signal. The resulting alias component 214 overwhelms the weak wanted signal component 200 and disrupts reception.

Figure 2C:
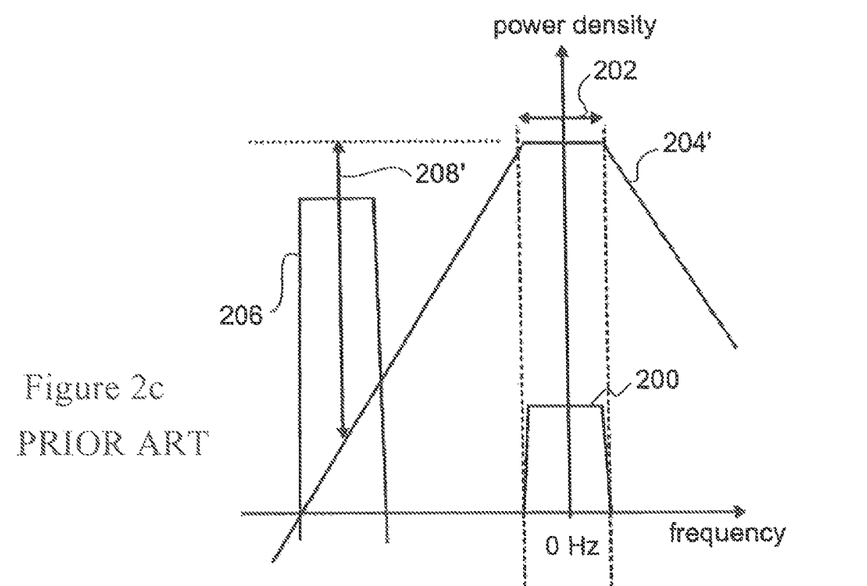
Figure 2D:
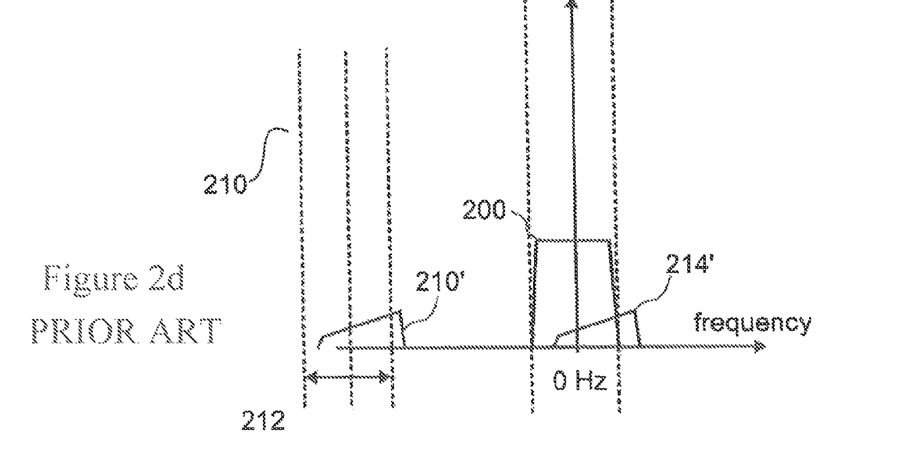

FIG. 2c shows a first solution, where analog baseband filter 128 implements a higher order frequency response 204' with an increased stop-band attenuation 208'. In FIG. 2d, the attenuated transmit leakage component 210' appears at such a low power level due to the increased stop-band attenuation 208' that its alias component 214' in FIG. 2d does not significantly deteriorate reception. Disadvantages to using a higher order frequency response are an increased current consumption of analog baseband filter 128 and an increased sensitivity of a higher order analog baseband filter to process and temperature variations that may lead to a general reduction in the received signal quality at modem 140.

Figure 2E:
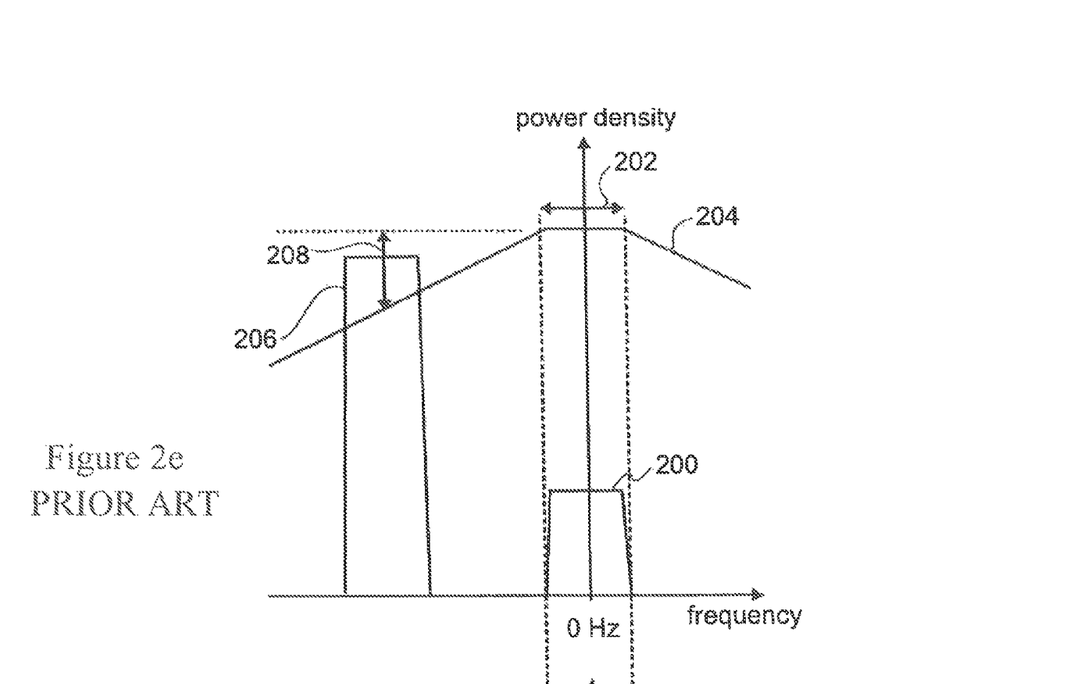
Figure 2F:
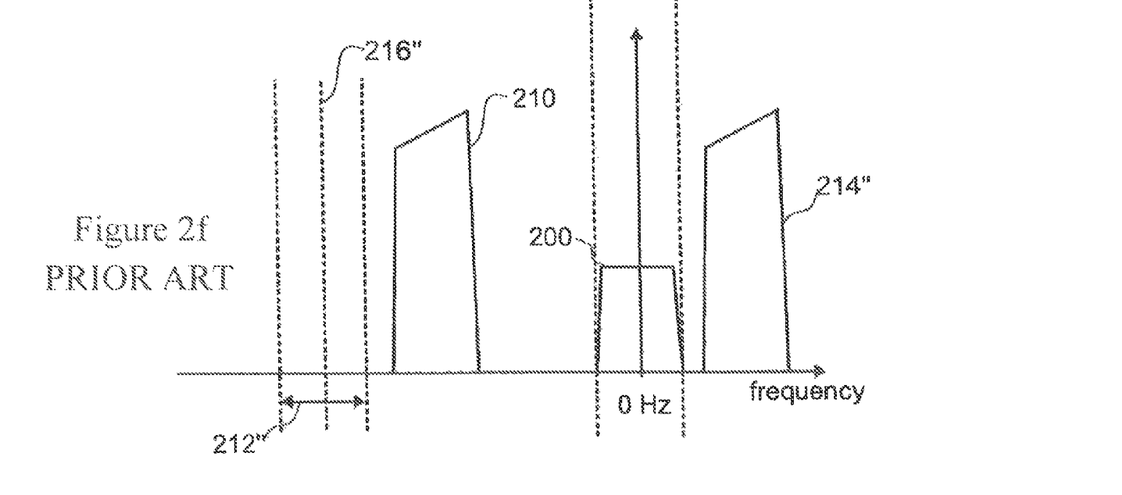

FIGS. 2e and 2f illustrate a second solution, where the conversion rate 216" has been increased to more the alias response 212" towards higher frequencies, avoiding substantial overlap with attenuated transmit leakage component 210. The resulting alias component 214" occupies a different frequency range than the wanted signal component 200 and can be separated by a later processing stage using digital filtering, for example. In FIG. 2f, alias component 214" and wanted signal component 220 are substantially non-overlapping. A disadvantage of the solution is that it is difficult or impossible to guarantee correct operation of the ADC at the increased conversion rate 216" under all conditions, as FIG. 2g illustrates in the following.

Figure 2G:
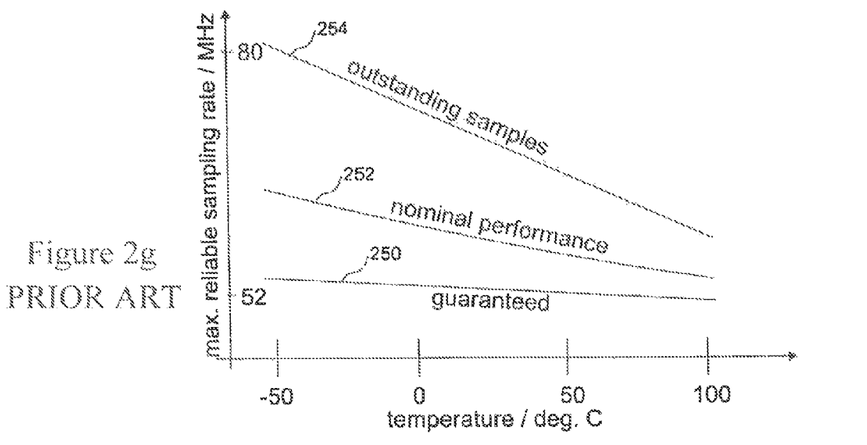
FIG. 2g is a graph that illustrates the achievable maximum sampling rate of an ADC depending on variations of the semiconductor process and temperature.

FIG. 2g shows the achievable maximum sampling rate of an ADC, such as ADC 132 in FIG. 1, depending on variations of the semiconductor process and temperature.

Transceiver 100 in FIG. 1 may be integrated partly or in whole in a radio frequency integrated circuit (RFIC) on a semiconductor process such as a 32 nm CMOS (complementary metal-oxide-semiconductor) process. Typically, duplex filter 108 and transmit amplifier 158, also known as "power amplifier", may be connected as external components to the RFIC.

The parameters of the semiconductor process may vary considerably as a result of many contributing factors, for example the production batch, operating temperature, circuit aging and even the location of each RFIC die on a CMOS production wafer. Coping with the expected parameter variations is a significant challenge in RFIC circuit design, where the goal is to design circuitry that works reliably for the widest possible range of parameter variations. ADC 132 is among the most challenging circuit blocks to design, and it may be impossible to achieve a sufficiently high conversion rate (also known as sampling rate) over all parameter variations. The statistic distribution of parameter variations tends to result in a bell-shaped, long-tailed probability curve for circuit performance that threes designers to rely on a rather low guaranteed conversion rate, while the maximum conversion rate that can be achieved with ADC 132 in the vast majority of cases is markedly higher.

Trace 250 in FIG. 2g illustrates the guaranteed conversion rate of an ADC, which is near 52 MHz. In comparison, the "nominal" performance in trace 252 that can be reached by the majority of manufactured ADCs, is over 58 MHz at room temperature, which is a 10% increase over guaranteed performance. Since the ADC is among the most difficult components to design, a 10% increase in performance is valuable and may notably improve the performance of the receiver. An "outstanding" manufactured ADC achieves the 58 MHz conversion rate over the whole temperature range, according to trace 254 and is capable of even higher rates at room temperature.

Conventionally, radio transceivers are designed for the guaranteed minimum performance of the components, for example based on trace 250 in FIG. 2g. Since the majority of manufactured ADCs will be able to perform better under most circumstances (room temperature), this is inefficient.

SUMMARY

The present invention generally introduces a method of mitigating effects of alias responses in a transceiver comprising a transmitter and a receiver, the receiver comprising an analog-to-digital converter.

According to a first aspect, the present invention provides a method of operating an analog-to-digital converter of a transceiver including a transmitter and a receiver, the receiver including said analog-to-digital converter, the method including: determining a maximum conversion rate of the analog-to-digital converter, wherein determining said maximum conversion rate comprises determining a temperature of the analog-to-digital converter; and selecting a conversion rate of the analog-to-digital converter, based on the determined maximum conversion rate and a frequency of an unwanted signal component of the receiver, such that the selected conversion rate places an alias response of the unwanted signal component to a frequency range which is substantially non-overlapping with a wanted signal component of the receiver.

According to another aspect, the present invention provides an apparatus including: a processing unit, at least one memory for storing a computer program, a transmitter and a receiver. The receiver includes an analog-to-digital converter. The at least one memory with the computer program being configured with the processing unit to cause the progressing unit to: determine a maximum conversion rate of the analog-to-digital converter, wherein determining said maximum conversion rate comprises determining a temperature of the analog-to-digital converter; and select a conversion rate of the analog-to-digital converter based on the determined maximum conversion rate and a frequency of an unwanted signal component of the receiver, such that the selected conversion rate places an alias response of the unwanted signal component to a frequency range which is substantially non-overlapping with a wanted signal component of the receiver.

According to yet another aspect of the invention, the present invention provides a non-transient program storage device readable by a processing unit, tangibly embodying a program of instructions executable by the processing unit, which, when executed by a processing unit of an apparatus which includes the processing unit, a transmitter and a receiver, where the receiver includes an analog-to-digital converter, causes the processing unit to determine a maximum conversion rate of the analog-to-digital converter, wherein determining said maximum conversion rate comprises determining a temperature of the analog-to-digital converter, and to select a conversion rate of the analog-to-digital converter based on the determined maximum conversion rate and a frequency of an unwanted signal component of the receiver, such that the selected conversion rate places an alias response of the unwanted signal component to a frequency range which is substantially non-overlapping with a wanted signal component of the receiver.

DETAILED DESCRIPTION

Reference will now be made in detail to the embodiments of the present invention, examples of which are illustrated in the accompanying drawings.

Embodiments of the present invention relate to a method, an apparatus and a computer program product for selecting a conversion rate for an analog-to-digital converter. The conversion rate selection is performed to operate the analog-to-digital converter at an advantageous conversion rate that is below a maximum conversion rate, which may change over time. Embodiments of the invention operate to mitigate effects of alias responses in a transceiver comprising a transmitter and a receiver, the receiver comprising such an analog-to-digital converter.

Figure 3:
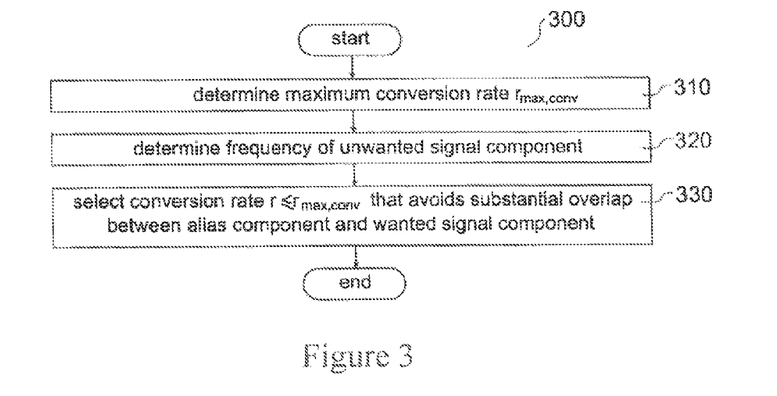
FIG. 3 is a flowchart of a method for selecting a conversion rate of an ADC as an embodiment of the invention.

FIG. 3 illustrates a flow chart of a method according to an embodiment of the invention. In one example embodiment, the method is applied by CPU 192 in radio transceiver 100 of FIG. 1, CPU 192 may initiate the method as a response to a change in radio resource allocation that is signalled by modern 140 via digital has interface 190d to CPU 192. The change in radio resource allocation may comprise a change in a transmission or reception bandwidth allocation, a change in transmission or reception radio channel, or a change in a transmission or reception band, for example. An example of transmission and reception bands is WCDMA band "I", where the transmission band extends from 1920 MHz to 1980 MHz and the reception band extends from 2110 MHz to 2170 MHz. In one example embodiment, CPU 192 initiates method 300 when a change in a measured temperature exceeds a hysteresis threshold relative to an earlier measured temperature.

At operation 310, a maximum conversion rate of an analog-to-digital converter is determined. In one example embodiment, a maximum conversion rate of ADC 132 in transceiver 100 of FIG. 1 is determined. At operation 320, a frequency of an unwanted signal component is determined. In an example embodiment, the unwanted signal component is transmit leakage from transmit signal 106 in transceiver 100 of FIG. 1, and the frequency of the unwanted signal component is a difference between a transmitted channel frequency and a received channel frequency that are utilized by the transceiver 100. At operation 330, such a conversion rate is selected which does not exceed the determined maximum conversion rate, so that an alias response of the unwanted signal component does not substantially overlap with the wanted signal component regarding their frequency bands.

Figure 4:
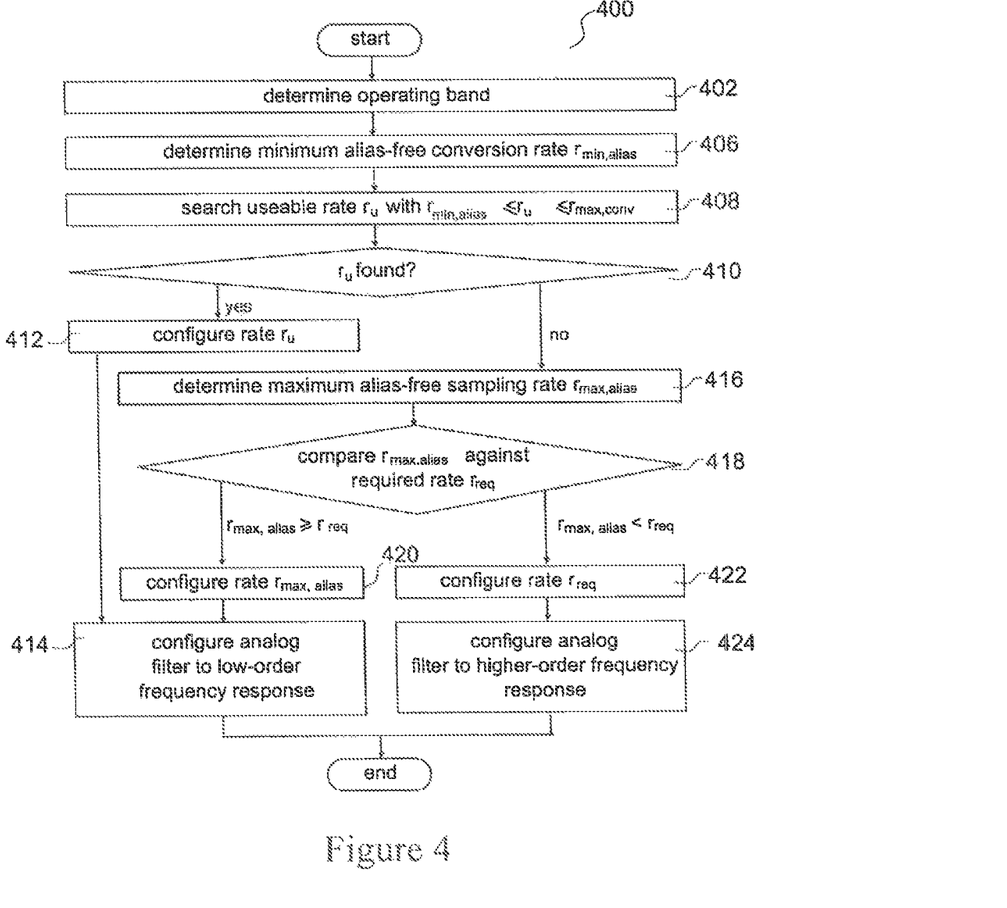
FIG. 4 is a detailed flowchart of a method for selecting the conversion rate.

FIG. 4 shows a flowchart of a method 400 for selecting a conversion rate. In one example embodiment, method 400 implements operation 330 of FIG. 3.

At operation 402, an operating band of the transceiver is determined. For example, the operating band may be band VIII in WCDMA/HSDPA operation, according to technical specification 3GPP TS 25.101. Thereafter, at operation 406, a minimum alias-free conversion rate is determined. In one embodiment of the invention, the minimum alias-free conversion rate is determined as $r_{min,alias}=|f_{Duplex}|+BW_{Tx}^{+}+BW_{Rx}^{+}$, where $|f_{Duplex}|$ is an absolute value of a duplex spacing, $BW_{Tx}^{+}$ is a one-sided bandwidth of the transmitted signal that is located in frequency on the side that is facing towards the received channel frequency, and $BW_{Rx}^{+}$ is a one-sided bandwidth of the received signal that is located in frequency facing towards the transmitted channel frequency. For example, in WCDMA band VIII, both $BW_{Rx}^{+}$ and $BW_{Tx}^{+}$ may be set to 2 MHz, and $|f_{Duplex}|$ may be set to 45 MHz.

In operation 408, a usable rate $r_u$ is searched which is greater than or equal to the minimum alias-free conversion rate, while not exceeding the maximum conversion rate. Searching a usable rate may also exclude rates that are known to result in unwanted spurious tones, for example caused by a harmonic of the rate falling into a receive channel bandwidth.

At operation 410, the execution of the example procedure is divided between two branches, depending on whether or not a usable rate $r_u$ is found. If a usable rate is found, the usable rate is configured at operation 412 as the conversion rate for the clock of an analog-to-digital converter. In one embodiment of the invention, the usable rate is configured to ADC sampling clock generator 172 in transceiver 100 of FIG. 1. Execution continues at operation 414, where an analog filter is configured to realize a low-order frequency response. In one embodiment of the invention, analog baseband filter 128 in transceiver 100 of FIG. 1 is configured as a $3^{rd}$ order response and the process ends.

If, on the other hand, a usable rate $r_u$ is not found, execution branches from operation 410 to operation 416 instead. At operation 416, a maximum alias-free conversion rate $r_{max,alias}$ is determined. In an example embodiment, the maximum alias-free conversion rate is determined as $r_{max}=|f_{Duplex}|+BW_{Tx}^{-}+BW_{Rx}^{-}$, where $BW_{Tx}^{-}$ is a one-sided bandwidth of the transmitted signal which is located in frequency on the side facing away from the received channel frequency, and $BW_{Rx}^{-}$ is a one-sided bandwidth of the received signal which is located in frequency facing away from the transmitted channel frequency. For example, in WCDMA band VIII, both $BW_{Rx}^{-}$ and $BW_{Tx}^{-}$ may be set to 2 MHz, and $f_{Duplex}$ may be set to 45 MHz.

In operation 418, the maximum alias-free conversion rate is compared against a required rate $r_{req}$. The required rate may be a predetermined constant which depends on the operating band. In one example embodiment, the required rate is 38 MHz for WCDMA band VIII operation. If the determined maximum alias-free conversion rate is greater than or equal to the required rate, the maximum alias-free conversion rate is configured as a conversion rate to an analog-to-digital converter and execution continues at operation 414. If, on the other hand, the determined maximum alias-free conversion rate is below the required rate, execution continues at operation 422, where the required rate is configured as the conversion rate to the analog-to-digital converter. In operation 424, the analog filter is configured to realize a higher-order frequency response and the process ends. In one example embodiment, analog baseband filter 128 in transceiver 100 of FIG. 1 is configured to a $5^{th}$ order response.

Figure 5:
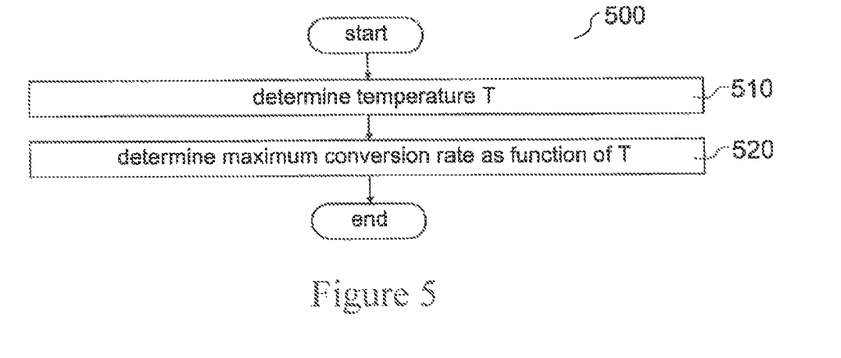
FIG. 5 is a flowchart of a method for determining the maximum conversion rate based on temperature.

FIG. 5 illustrates a method 500 for determining a maximum conversion rate. In one example embodiment, method 500 implements operation 310 in FIG. 3.

At first in the method of 500, a temperature T of the ADC is determined in operation 510. The ADC occupies a finite area on a semiconductor substrate, and a temperature gradient will be present in all three dimensions. Therefore, any temperature measurement can reflect the physical reality only to a limited degree of accuracy. For example, temperature can be measured with high accuracy using a sensor located on the semiconductor die near the ADC, or with somewhat lower accuracy using a sensor located close to the RFIC component on a printed wiring board (PWB). Thus, it may be stated that a temperature of the ADC can be determined by measuring a temperature at a location close to the ADC. In an example embodiment, the temperature of the ADC is measured using a temperature sensor that forms part of temperature compensation unit 124 for reference crystal oscillator 122 of transceiver 100 in FIG. 1. CPU 192 may request a temperature reading via bus interfaces 190e and 190a from temperature compensation unit 124. Also, temperature may be measured b a sensor which is located on a RFIC or requested from chipset 180, for example.

In operation 520, the maximum conversion rate is determined based on the temperature T. The maximum conversion rate may be determined by interpolating in temperature using interpolation coefficients. In one example embodiment, the RFIC classifies its process parameters, for example by measuring a RC time constant, or determining the frequency of a test oscillator into one of the three categories "outstanding", "nominal" or "guaranteed performance", and looks up the interpolation coefficients based on the classification of the process parameters. This is already illustrated in FIG. 2g. In one example embodiment of the invention, the maximum conversion rate is determined as a predetermined constant if temperature exceeds a threshold.

Figure 6:
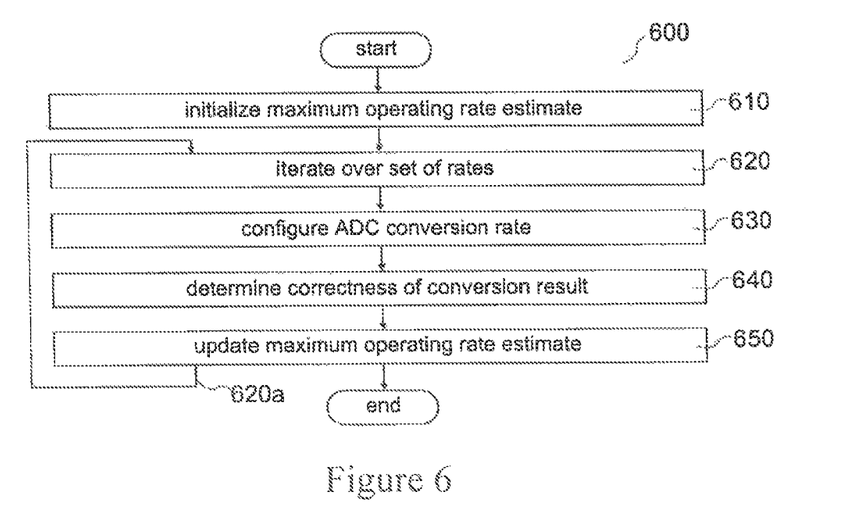
FIG. 6 is a flowchart of a method to determine a maximum conversion rate.

FIG. 6 illustrates another method 600 to determine a maximum conversion rate of an ADC. Method 600 may implement operation 310 of FIG. 3 as an embodiment of the invention.

At operation 610 of the method, a maximum conversion rate estimate is initialized, for example to a worst-case conversion rate which is guaranteed by the manufacturer of the ADC. At operation 620, a loop iterates over a set of possible operation rates. The set of possible rates may be rates that can be divided from a high frequency clock using integer division factors. Rates may be iterated in an increasing order. At operation 630, the iterated rate is configured as conversion rate to an ADC.

Thereafter, in operation 640, the correctness of a conversion result from the ADC is tested. In one example embodiment, the correctness of the conversion result is determined by operating the receiver on a known test signal (for example generated by the transmitter in "loop-back testing"). In one example embodiment of the invention, the correctness of the conversion result is determined by comparing a signal quality indicator of the down-sampled received signal 138 in FIG. 1 against a predetermined threshold. The signal quality indicator may be a bit error rate (BER) provided by modem 140, and determining the correctness of the conversion result returns a positive test result if the bit error is below a predetermined threshold, or otherwise, a negative test result. The signal quality indicator may be an error vector magnitude (EVM) provided by modem 140, and determining correctness of the conversion result may return a positive test result if the EVM in units of dB is below a predetermined threshold or, otherwise, a negative test result is returned. In operation 650, the maximum conversion rate estimate is updated to the iterated rate if the conversion result was found correct.

Figure 7A:
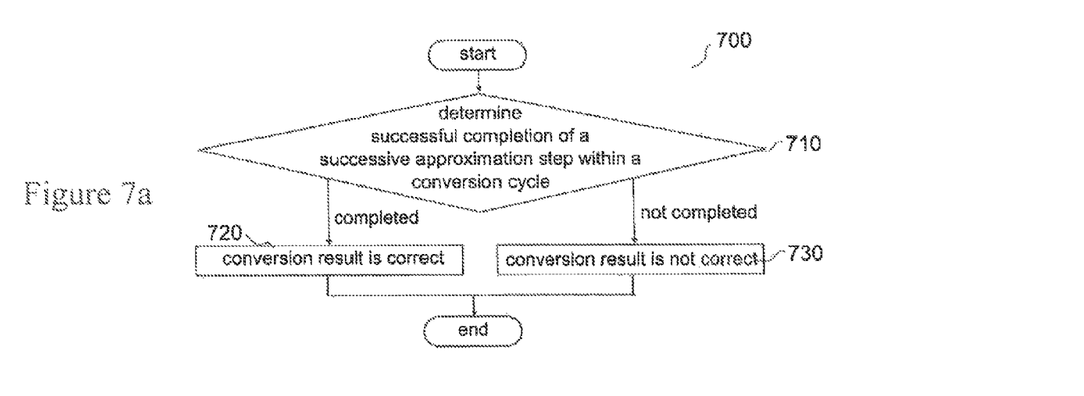
FIGS. 7a is a flowchart of a method to determine correctness of a conversion result and FIGS. 7b and 7c are timing diagrams that illustrate internal processes of an analog-to-digital converter.

FIG. 7a illustrates a flowchart of a method 700 according to an embodiment of the invention. Method 700 may implement operation 630 in method 600 of FIG. 6.

At operation 710 of the method 700, the successful completion of an approximation step in an analog-to-digital converter is tested. The analog-to-digital converter may be a successive-approximation (SAR) ADC. The tested approximation step may be the final approximation step of a series of approximation steps. If successful completion is determined, operation continues at operation 720, where a positive test result is returned, indicating correctness of the conversion result. If successful completion is not determined, operation continues instead at operation 730, where a negative test result is returned, further indicating failure to convert correctly.

Figure 7B:
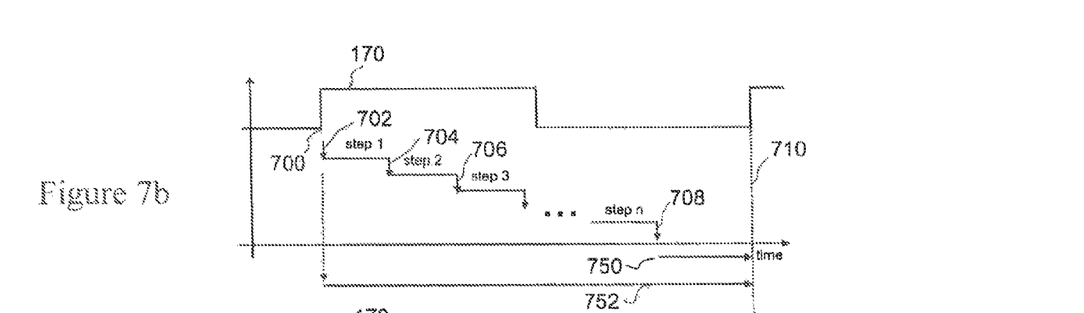

For illustration, FIG. 7b shows a series of successive approximation steps in a SAR ADC. ADC sampling clock signal 170 initiates a new conversion cycle at each leading edge and triggers a sequence of conversion steps 702, 704, 706 leading to the final step 708. Upon completion of step 702, step 704 is triggered using asynchronous logic. The time for each step to converge depends on the temperature of the ADC, therefore an ADC may be able to achieve only a lower maximum conversion rate when temperature increases.

Figure 7C:
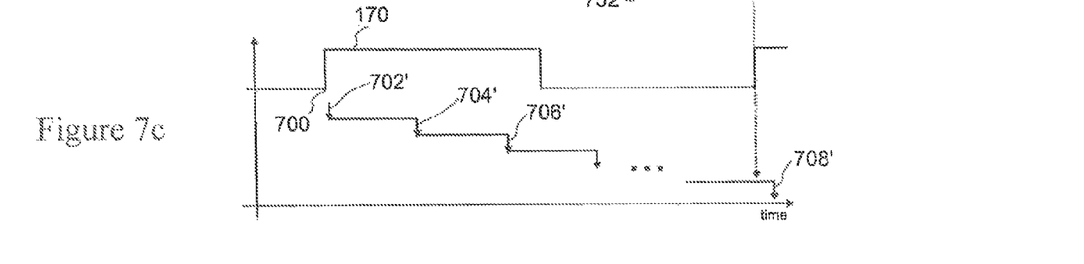

FIG. 7c shows the conversion process at an elevated temperature. The sequence of conversion steps 702 . . . 708 succeeds at room temperature in FIG. 7b, since conversion step 708 concludes before the start of the next conversion cycle 710. In FIG. 7c, the longer duration of conversion steps 702', 704', 706', . . . , 708' at the elevated temperature causes the conversion process to exceed the cycle length of ADC sampling clock signal 170. Thus, conversion fails and returns an incorrect conversion result.

In one example embodiment of the invention, the ADC determines an estimate of the maximum conversion rate by measuring a remaining time 750 in FIG. 7b between the end of an approximation step in a SAR ADC and the end of a conversion cycle. The maximum con version rate may be estimated by scaling the current conversion rate with the ratio of remaining time 750 to conversion cycle length 752.

Figure 8:
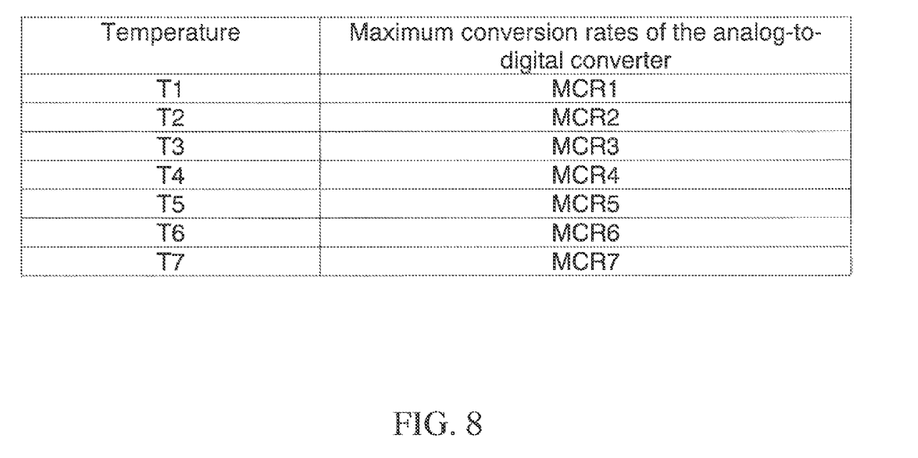
FIG. 8 is a datable table showing linking temperatures with maximum conversion rates of the analog-to-digital converter.

Whenever the maximum conversion rate of an analog-to-digital converter is determined based on the temperature T, e.g., for step 520 in FIG. 5, a data table may be used, such as shown in FIG. 8 in which sample maximum conversion rates MCR1-MCR7 are correlated to temperatures T1-T7.

The inventive idea comprises a computer program product which is adapted to perform applicable operations when executed in a data-processing device such as a processing unit or a CPU of the system, for instance. Such a processor may thus be the processing unit of the transceiver itself or control logic available internally in the system or remotely in the network. The computer program product may be embodied in a computer-readable medium.

The advantage of the invention is that the alias response effect on the received signal is clearly mitigated and such an effect is achieved with notably low power consumption.

It will be obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method of determining a maximum conversion rate for an analog-to-digital converter of a transceiver, the transceiver comprising a transmitter, a temperature compensation unit and a receiver, the receiver comprising said analog-to-digital converter, the method comprising:

determining the maximum conversion rate for the analog-to-digital converter from among a plurality of possible maximum conversion rates, wherein the step of determining said maximum conversion rate comprises determining a temperature by the temperature compensation unit and then determining, dependent on the determined temperature, which of the plurality of possible maximum conversion rates will be the determined maximum conversion rate as a function of the temperature; and selecting a conversion rate for the analog-to-digital converter that is equal to or less than the determined maximum conversion rate based on the determined maximum conversion rate and a frequency of an unwanted signal component of the receiver, such that the selected conversion rate places an alias response of the unwanted signal component to a frequency range which is substantially non-overlapping with a wanted signal component of the receiver.

2. The method according to claim 1, wherein the step of selecting the conversion rate further comprises using a data table for linking temperatures with the plurality of possible maximum conversion rates, such that the maximum conversion rate is obtained upon inputting the determined temperature into the data table.

3. The method according to claim 1, wherein the maximum conversion rate is determined to be a predetermined value if the determined temperature exceeds a threshold.

4. The method according to claim 1, wherein the step of determining the temperature comprises using temperature measurement provided by the temperature compensation unit and a reference oscillator of the transceiver.

5. The method according to claim 1, wherein the step of selecting the conversion rate comprises:
determining an operating band of the transceiver;
determining a minimum alias-free conversion rate;
searching for a usable rate which is greater than or equal to the determined minimum alias-free conversion rate and does not exceed the determined maximum conversion rate; and
when the usable rate is found,
selecting the usable rate as the conversion rate for the analog-to-digital converter, and
configuring an analog filter of the receiver to perform a filter function having a lower order response.

6. The method according to claim 1, wherein the unwanted signal component is a transmit leakage from a transmission signal in the transmitter.

7. An apparatus comprising:
a processing unit,
at least one memory for storing a computer program, and
a transceiver coupled to the processing unit, the transceiver comprising a temperature compensation unit, a transmitter and a receiver, the receiver comprising an analog-to-digital converter,
the at least one memory with the computer program being configured with the processing unit to cause the processing unit to:
determine a maximum conversion rate for the analog-to-digital converter from among a plurality of possible maximum conversion rates, wherein determining said maximum conversion rate comprises determining a temperature by the temperature compensation unit and then determining, dependent on the determined temperature, which of the plurality of possible maximum conversion rates will be the determined maximum conversion rate as a function of the temperature; and
select a conversion rate for the analog-to-digital converter that is equal to or less than the determined maximum conversion rate based on the determined maximum conversion rate and a frequency of an unwanted signal component of the receiver, such that the selected conversion rate places an alias response of the unwanted signal component to a frequency range which is substantially non-overlapping with a wanted signal component of the receiver.

8. The apparatus according to claim 7, further comprising a data table used for linking temperatures with the plurality of possible maximum conversion rates, such that the maximum conversion rate is obtained upon inputting the determined temperature into the data table.

9. The apparatus according to claim 7, wherein the processing unit is configured to determine the maximum conversion rate is determined to be a predetermined value if the determined temperature exceeds a threshold.

10. The apparatus according to claim 7, wherein the transceiver further includes a reference oscillator and the temperature compensation unit, configured to provide temperature measurement controlled by the processing unit.

11. The apparatus according to claim 7, wherein the processing unit is configured to determine an operating band of the transceiver, determine a minimum alias-free conversion rate and search a usable rate which is greater than or equal to the determined minimum alias-free conversion rate and does not exceed the determined maximum conversion rate, and when the usable rate is found, wherein the processing unit is configured to select the usable rate as the conversion rate for the analog-to-digital converter, the receiver further comprising
an analog filter configured to perform a filter function having a lower order response when the usable rate is found.

12. The apparatus according to claim 7, wherein the unwanted signal component is a transmit leakage from a transmission signal in the transmitter.

13. A non-transitory computer-readable medium embodying instructions that when executed cause a processing unit to perform a method of determining a maximum conversion rate for an analog-to-digital converter of a transceiver, the transceiver comprising a temperature compensation unit, a transmitter, and a receiver, wherein the receiver comprises the analog-to-digital converter, the method comprising:
determining a maximum conversion rate for the analog-to-digital converter from among a plurality of possible maximum conversion rates, wherein determining said maximum conversion rate comprises determining a temperature by the temperature conversion unit and then determining, dependent on the determined temperature, which of the plurality of possible maximum conversion rates will be the determined maximum conversion rate as a function of the temperature; and
selecting a conversion rate for the analog-to-digital converter that is equal to or less than the determined maximum conversion rate based on the determined maximum conversion rate and a frequency of an unwanted signal component of the receiver, such that the selected conversion rate places an alias response of the unwanted signal component to a frequency range which is substantially non-overlapping with a wanted signal component of the receiver.

14. The non-transitory computer-readable medium according to claim 13, wherein selecting the conversion rate further comprises using a data table for linking temperatures with the plurality of possible maximum conversion rates of the analog-to-digital converter, such that the maximum conversion rate is determined upon inputting the determined temperature into the data table.

15. The non-transitory computer-readable medium according to claim 13, wherein the maximum conversion rate is determined to be a predetermined value if the determined temperature exceeds a threshold.

16. The non-transitory computer-readable medium according to claim 13, wherein determining the temperature comprises using temperature measurement provided by the temperature compensation unit and a reference oscillator of the transceiver receiver.

17. The non-transitory computer-readable medium according to claim 13, wherein the step of selecting the conversion rate comprises:
- determining an operating band of the transceiver;
- determining a minimum alias-free conversion rate;
- searching for a usable rate which is greater than or equal to the determined minimum alias-free conversion rate and does not exceed the determined maximum conversion rate; and
- when the usable rate is found,
    - selecting the usable rate as the conversion rate for the analog-to-digital converter, and
    - configuring an analog filter of the receiver to perform a filter function having a lower order response.

18. The non-transitory computer-readable medium according to claim 13, wherein the unwanted signal component is a transmit leakage from a transmission signal in the transmitter.

* * * * *